United States Patent Office 3,101,361
Patented Aug. 20, 1963

3,101,361
CATALYTIC PREPARATION OF CHLORO-
SILOXANES IN POLAR SOLVENTS
Paul L. Brown, Saginaw, and James Franklin Hyde, Midland, Mich., assignors to Dow Corning Corporation, Midland, Mich., a corporation of Michigan
No Drawing. Filed Jan. 5, 1961, Ser. No. 80,749
1 Claim. (Cl. 260—448.2)

This invention relates to the interaction of a halogenosilicon compound with an organosiloxane in contact with combinations of certain catalysts and polar solvents.

The equilibrium reactions of halogenosilanes with organosiloxanes are well-known as evidenced by the disclosure of United States Patent 2,421,653. However, this type of reaction has several undesirable features. First, there is always some unreacted halogenosilane and organosiloxane. Second, the equilibrium conditions are so severe as to cause the cleavage of radicals such as the phenyl and vinyl radicals from the silicon atoms. For example, where no catalyst is employed, it is necessary to heat the reactants under pressure long hours at high temperatures. Where such conditions are impractical so that a catalyst is necessary, the recommended hydrogen halide or Lewis acid catalysts presently recognized in the art are well known for rearranging SiOSi bonds as well as cleaving organic radicals from silicon atoms to which they are attached. The search for a non-bond-rearranging catalyst which would bring the halogenosilane-organosiloxane reaction to completion has been intense.

The primary object of this invention is to provide a catalytic system for the reaction of halogenosilanes or halogenosiloxanes with organosiloxanes without siloxane bond rearrangement or group cleavage. Another object is to provide an essentially acid-free system for the above type of reaction. Another object is to provide such a system whereby controlled copolymerization is possible. These objects are satisfied by this invention.

This invention relates to the method of interaction of a silane or siloxane containing at least one halogenated silicon atom per molecule with a siloxane having an average degree of substitution of from two to three atoms or radicals per silicon atom in contact with combinations of certain catalysts and polar solvents.

More specifically, this invention relates to the method which comprises interacting (A) a silicon compound containing per molecule at least one silicon atom having attached thereto at least one halogen atom and no more than two organic radicals selected from the group consisting of hydrocarbon radicals, halogenoaromatic monovalent hydrocarbon radicals and fluorinated aliphatic monovalent hydrocarbon radicals, any remaining valences of said silicon atom being satisfied by substituents selected from the group consisting of silicon-bonded oxygen atoms and hydrogen atoms, any other silicon atoms in said compound having their valences satisfied by substituents selected from the group consisting of silicon-bonded oxygen atoms, hydrogen atoms, hydrocarbon radicals, halogenoaromatic monovalent hydrocarbon radicals and fluorinated aliphatic monovalent hydrocarbon radicals, with (B) an organosiloxane containing per silicon atom an average of from about two to three monovalent substituents selected from the group consisting of hydrogen atoms, hydrocarbon radicals, halogenoaromatic hydrocarbon radicals and fluorinated aliphatic hydrocarbon radicals, any siloxane (B) which has two of said monovalent substituents attached to each silicon atom containing at least four such silicon atoms, any remaining silicon valences being satisfied by silicon-bonded oxygen atoms, in contact with (C) a catalyst selected from the group consisting of aliphatic hydrocarbon amines containing per molecule less than 10 carbon atoms, salts of hydrogen halides and said aliphatic hydrocarbon amines, salts of monocarboxylic acids and aliphatic hydrocarbon amines, said salts containing less than 10 carbon atoms per molecule, aromatic amines, salts of monocarboxylic acids and aromatic amines, salts of hydrogen halides and aromatic amines, salts of monocarboxylic acids and hydrocarbon-substituted quaternary ammonium hydroxides, said salts containing less than 10 carbon atoms per molecule, salts of hydrogen halides and hydrocarbon-substituted quaternary ammonium hydroxides, said salts containing less than 18 carbon atoms per molecule, ammonium halides, ammonium carboxylates, amides and alkali metal halides and (D) an organic solvent other than (C) which has a static dielectric constant greater than about 4, preferably greater than 10, whereby a halogen atom from a molecule of A replaces an oxygen atom attached to a silicon atom in a molecule of B and the remainder of said A molecule attaches to the free oxygen bond in the remainder of the original B molecule.

Organosilicon compound A can be a silane containing one, two, three or four halogen atoms or a siloxane containing from one halogen atom per molecule to three halogen atoms per silicon atom. The remaining valences of the silicon valences in compound A can be satisfied by any of certain monovalent substituents. Compound A can be silane of the formula, for example, $XSiR_2H$, $XSiRH_2$, $XSiH_3$, $X_2SiR_2$, $X_2SiHR$, $X_2SiH_2$, $X_3SiR$, $X_3SiH$ or $X_4Si$ in which each X is a halogen atom and each R is a subsequently-defined monvalent organic radical. Compound A can also be a siloxane made up, for example, of any combination of the following siloxane units: $SiR_3O_{0.5}$, $SiHR_2O_{0.5}$, $SiH_2RO_{0.5}$, $SiH_3O_{0.5}$, $SiR_2O$, $SiHRO$, $SiH_2O$, $SiHO_{1.5}$, $SiRO_{1.5}$, $SiO_2$, $SiR_2XO_{0.5}$, $SiHRXO_{0.5}$, $SiH_2XO_{0.5}$, $SiRXO$, $SiHXO$, $SiXO_{1.5}$ $SiX_2O$ or $SiX_3O_{0.5}$ units in which each X is a halogen atom and each R is a subsequently-defined monovalent organic radical. Compound A can include SiR′Si linkages where R′ is a divalent hydrocarbon radical such as the methylene, ethylene and phenylene radicals. However, there must be at least one halogenated siloxane unit in any siloxane employed as compound A.

Organosiloxane B can be any cyclic siloxane of at least four silicon atoms or any linear siloxane containing per silicon atom an average of from about two to three of certain monovalent substituents. More specifically, organosiloxane B can be any siloxane made up, for example, of any combination of the following siloxane units: $SiR_3O_{0.5}$, $SiHR_2O_{0.5}$, $SiH_2RO_{0.5}$, $SiH_3O_{0.5}$, $SiR_2O$, $SiHRO$, $SiH_2O$, $SiHO_{1.5}$, $SiRO_{1.5}$, or $SiO_2$ units in which each R is a subsequently-defined organic radical.

The organic radicals R which can be present in A and B include monovalent hydrocarbon radicals, monovalent halogenoaromatic hydrocarbon radicals and monovalent fluorinated aliphatic hydrocarbon radicals.

More specifically, each R can be, for example, any alkyl radical such as the methyl, ethyl, isopropyl, isobutyl, tert-butyl, 2-ethylhexyl, dodecyl, octadecyl and myricyl radicals; any alkenyl radical such as the vinyl, allyl and hexadienyl radicals; any cycloalkyl radical such as the cyclopentyl and cyclohexyl radicals; any cycloalkenyl radical such as the cyclopentenyl and cyclohexenyl radicals; any aryl hydrocarbon radical such as the phenyl, naphthyl and xenyl radicals; any aralkyl radical such as the benzyl, phenylethyl and xylyl radicals and any alkaryl radical such as the tolyl and dimethylphenyl radicals. These monovalent hydrocarbon radicals can also contain aromatic halogen atoms such as, for example, in the 2,4,6-trichlorobenzyl, perchlorophenyl, 2-bromonaphthyl, p-iodo-phenylethyl and p-fluorophenyl radicals; and aliphatic fluorine atoms such as, for example, in the 3,3,3-trifluoropropyl, α,α,α-trifluorotolyl, 3,3,4,4,5,5,5-heptafluoropentyl and 5,5,5-trifluoro-2-trifluoromethylamyl radicals.

In the reaction of this invention a halogen atom from a molecule of A replaces an oxygen atom attached to a silicon atom in a molecule of B and the remainder of said A molecule attaches to the free oxygen bond in the remainder of the original B molecule. Some examples of this reaction include:

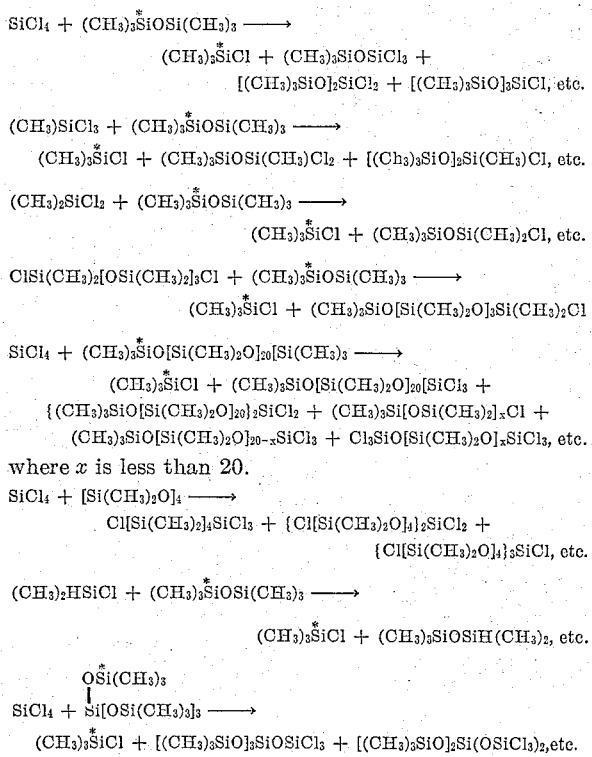

where $x$ is less than 20.

In the above reactions the methyl radicals can be replaced by any other of the above-defined R radicals. Similarly, the chlorine atoms can be replaced by other halogen atoms, e.g. bromine, iodine or fluorine, although chlorine is preferred.

The inventive features of the method of this invention resides in the claimed interaction without siloxane bond rearrangement and in the use as catalysts of the well known compounds described below in conjunction with certain solvents. These catalysts (C) include aliphatic hydrocarbon amines containing less than 10 carbon atoms per molecule, hydrogen halide salts of such amines, aliphatic hydrocarbon amine carboxylates containing less than 10 carbon atoms per molecule, aromatic amines, aromatic amine carboxylates, aromatic amine hydrohalides, quaternary ammonium carboxylates containing less than 10 carbon atoms per molecule, quaternary ammonium halides containing less than 18 carbon atoms, ammonium halides, ammonium carboxylates, amides and alkali metal halides.

More specifically, these catalysts (C) include, for example, allylamine, butylamine, amylamine, trimethylamine, dimethylamylamine, n-hexylamine, tri-n-propylamine, di-ethylamine, 1,2-dimethyl-4-pentenylamine, ethylenediamine, methylamine 2-ethylhexoate, di-n-propylamine acetate, propylamine hexoate, n-hexylamine acetate, triethylamine formate, dibutylamine hydrochloride, isopropylamine hydrobromide, dimethylheptylamine hydrochloride, aniline, benzylamine, di-m-tolylamine, tribenzylamine, 9-phenanthrylamine, N-phenyl-o-phenylenediamine, aniline octoate, phenylamine acetate, dibenzylamine 2-ethylhexoate, 3,4-dichloroaniline caproate, p-tolylamine stearate, diphenylamine hydrochloride, benzylamine hydrobromide, tetramethylammonium butyrate, butyltrimethylammonium acetate, tetraethylammonium formate, benzyltrimethylammonium chloride, diphenyldimethylammonium iodide, dodecyltrimethylammonium chloride, ammonium chloride, ammonium stearate, ammonium acetate, o-aminoacetanilide, iminodiacetonitrile, m-aminoacetophenone, o-nitroaniline, o-amisidine, 4,4'-diaminoazobenzene, anthranilonitrile, diethylenetriamine, difurfurylamine, histamine, 1-ethyl-2-phenylhydrazine, morpholine, 5-nitronaphthylamine, piperazine, piperidine, 2-aminopyridine, 6-nitro-o-toluidine, 2-amino-p-toluenitrile, acetamide, N-ethylacetamide, acetanilide, adalin, m-nitrobenzanilide, ethyl carbamate, methylurethane, cinnamamide, cyanamide, diacetamide, formamide, N,N-diphenylformamide, N,N-dimethylformamide, formohydrazide, 1,1,3,3-tetraphenylguanidine, malonamide, myristamide, 2-naphthamide, N-acetyl-2-naphthylamine, oleamide, phenocoll, phthalamide, 1-formyl-piperidine, M-toluamide, urea, N-allyl-N'-phenyl urea, sodium chloride and potassium bromide.

The amount of catalyst (C) is not critical although from about 0.01 to about 2 percent by weight based on the combined weight of A and B is preferred. Less than about 0.01 percent of catalyst is impractical due to reduction of reaction rate. More than about 2 percent by weight of catalyst is unnecessary but can be employed.

The method of this invention with any of the above catalysts requires the use of a polar solvent other than the catalyst employed. One measure of solvent polarity is the static dielectric constant. Hydrocarbon solvents have static dielectric constants of less than about 3. Halogenated hydrocarbons as well as ethers generally have static dielectric constants greater than 4. The introduction of nitrogen atoms into the solvent molecular structure as in nitrile groups, nitro groups and amide groups raises the static dielectric constants of such solvents to above 10. The term inert excludes such functions as, for example, the hydroxyl group, the thiol group, ketones which enolize to give hydroxyl groups.

For this invention a suitable inert polar solvent (D) is one which has a static dielectric constant greater than about 4 and preferably greater than 10. Such solvents include, for example, chloroform, bromoform, dichloromethane, iodomethane, dibromomethane, 1,1,1-trichloroethane, o-dibromobenzene, p-fluorotoluene, methylbutyl ether, the dimethyl ether of ethylene glycol, tetrahydrofuran, β,β'-dichlorodiethylether, acetonitrile, propionitrile, butyronitrile, valeronitrile, benzonitrile, cyclohexonitrile, capronitrile, succinonitrile, ethoxyacetylene, pyridine, nitromethane, nitroethane, nitropropane, nitrooctane, nitrobenzene, nitrotoluene, nitrocyclohexane, 1-chloro-2-nitrobenzene, formamide, acetamide, dimethylformamide, dimethylacetamide, tetramethylurea and ethyl carbamate.

The amount of solvent (D) is not critical although generally at least about 10 percent by weight of solvent based on the combined weight of A and B should be employed. More than about 100 percent by weight of solvent based on the combined weight of A and B is wasteful but can be employed.

The method of this invention is operative at room temperature, but the rate of interaction can be increased in some instances by heating the system. However, generally temperatures of more than about 150 C. are not desirable.

The method of this invention is useful for introducing functionality in the form of silicon-bonded halogen atoms into molecules where no such functionality previously existed. Thus, a comparatively inert material can be converted to an active material useful, for example, as a cross-linking agent in a rubber or resin. The method of this invention is useful for building more precise organosilicon structures not possible in the presence of siloxane bond rearranging catalysts.

The following examples are illustrative of the best method of practicing this invention but are not intended to limit this invention which is properly delineated in the claims. The symbols, Me, Et, Vi and Ph represent the methyl, ethyl, vinyl and phenyl radicals.

EXAMPLE 1

To a mixture of 79.25 parts by weight hexamethyldisiloxane and 20.75 parts by weight of tetrachlorosilane was added 0.1 part by weight of trimethylamine and 20.7 parts by weight of acetonitrile. After 115 hours at room temperature in a closed system the mixture was found by infrared analysis to contain no tetrachlorosilane and 33.2 percent by weight trimethylchlorosilane. This conforms to the reaction:

$$SiCl_4 + n(R_3Si)_2O \rightarrow nR_3SiCl + (R_3SiO)_nSiCl_{4-n}$$

in which $n$ has an average value of 3.12 and each R is a methyl radical. The products included $Me_3SiOSiCl_3$, $(Me_3SiO)_2SiCl_2$, $(Me_3SiO)_3SiCl$ and $(Me_3SiO)_4Si$.

EXAMPLE 2

Similar results are obtained when 30 parts by weight of each of the following solvents is substituted for the 20.7 parts by weight of acetonitrile in Example 1: o-dibromobenzene, methylbutyl ether, benzonitrile, pyridine, nitroethane, nitrotoluene, formamide and tetramethylurea.

EXAMPLE 3

60.8 grams of hexamethyldisiloxane, 14.7 grams of tetrachlorosilane, 44.7 grams of chloroform and 0.34 gram of dimethylformamide were mixed together and allowed to stand in a closed system for 312 hours at room temperature after which infrared analysis showed no detectable tetrachlorosilane and 26.3 percent by weight trimethylchlorosilane corresponding to an average value of 3.37 for $n$ in the equation of Example 1.

EXAMPLE 4

405 grams of hexamethyldisiloxane and 85 grams of tetrachlorosilane were mixed with 39 grams of acetonitrile and 1 gram of dimethylformamide. After standing in a closed system for 18 hours the mixture was filtered and stripped of unreacted components under vacuum. The residue was found by infrared analysis to be essentially tetrakistrimethylsiloxysilane.

EXAMPLE 5

22 grams of tetrachlorosilane, 39 grams of acetonitrile and 0.27 gram of dimethylformamide were mixed with 125 grams of a trimethylsiloxy-endblocked dimethylpolysiloxane having a viscosity at 25° C. of 2 cs. This mixture was heated at reflux temperature for at least 72 hours and checked by infrared analysis for tetrachlorosilane and trimethylchlorosilane. There was no tetrachlorosilane detected in the product. There was approximately 19.7 percent by weight trimethylchlorosilane in the product.

EXAMPLE 6

A mixture was prepared of 30 grams of

70 grams of $HMe_2SiOSiMe_2H$, 20 grams of acetonitrile and between 0.5 and 1.0 gram of dimethylformamide. After 120 hours at room temperature in a closed system the mixture was found by infrared analysis to contain 12 percent by weight of $HMe_2SiCl$.

Similar results are achieved when $Cl_3SiCH_2CH_2SiCl_3$ is substituted mol per mol for the

above.

EXAMPLE 7

A mixture was prepared of 296 grams of octamethylcyclotetrasiloxane, 129 grams of dimethyldichlorosilane, 78.3 grams of acetonitrile, 5 grams of dimethylformamide and a trace of ammonium iodide. This mixture was heated in a closed system for 168 hours at 70° C. Stripping the product at 22 mm. Hg absolute pressure and no more than 90° C. produced no detectable amount of dimethyldichlorosilane and only a small amount of octamethylcyclotetrasiloxane. The residue contained 13.28 percent by weight chlorine equivalent to a product of the general formula $Cl(SiMe_2O)_{5.43}SiMe_2Cl$.

EXAMPLE 8

50 grams of a chlorine-endblocked dimethylpolysiloxane fluid containing an average of 21 silicon atoms per molecule and 12 grams of hexamethyldisiloxane were mixed with 10 grams of acetonitrile and 1 gram of dimethylformamide and heated in a closed system for 20 hours at 75° C. Infrared analysis showed 3.3 percent by weight of trimethylchlorosilane in the product.

EXAMPLE 9

5 grams of each of the following chlorosilanes were added to separate identical mixtures each containing 30 grams of a trimethylsiloxy-endblocked dimethylpolysiloxane having a viscosity at 25° C. of approximately 100 cs., 5 grams of acetonitrile and 0.68 gram of dimethylformamide. Each mixture was heated in a closed system for 30 hours at 75° C. and subsequently stripped of acetonitrile, dimethylformamide and any remaining chlorosilane. The residue was analyzed for chlorine, the presence of chlorine showing that chlorine from the chlorosilane reactant had been introduced into the siloxane structure.

*Table I*

| Chlorosilane: | Chlorine in residue (percent by weight) |
|---|---|
| $MeSiCl_3$ | 9.12 |
| $Me_2SiCl_2$ | 7.42 |

EXAMPLE 10

35 grams of dimethyldichlorosilane were mixed with 25 grams of tetrakis-trimethylsiloxysilane, 10 grams of acetonitrile and 0.85 gram of dimethylformamide. The mixture was heated in a closed system for 18 hours at 75° C. Infrared analysis showed 47.1 percent by weight of trimethylchlorosilane. The acetonitrile, dimethylformamide and chlorosilanes were stripped off, and the residue contained 27.18 percent by weight of chlorine showing that chlorine from the chlorosilane reactant had been introduced into the siloxane structure.

This experiment was repeated using 39 grams of methyltrichlorosilane in place of the 35 grams of dimethyldichlorosilane. Infrared analysis showed 27.5 percent by weight of trimethylchlorosilane in the unstripped residue. The stripped residue contained 46.4 percent by weight chlorine.

EXAMPLE 11

720 grams of sym-tetramethyldihydrogendisiloxane, 236 grams of $HSiCl_3$, 235 grams of acetonitrile and 4.72 grams of dimethylformamide were mixed together at room temperature for about 744 hours. The product was suspected to be primarily a mixture of

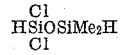

and $HMe_2SiCl$. This was verified by reacting this mixture with ZnO to form $ZnCl_2$ and SiOSi linkages, stripping off the catalysts and any disiloxane, fractionating the residue and isolating a cut boiling at 69.5 to 73° C. at 28 mm. Hg and identified by infrared analysis to be $HSi(OSiMe_2H)_3$.

EXAMPLE 12

When a mixture of 592 grams of octamethylcyclotetrasiloxane, 149.5 grams of monomethyltrichlorosilane, 211.5 grams of monophenyltrichlorosilane, 100 grams of acetonitrile and approximately 1 gram of n-hexylamine is refluxed for two weeks, no monomethyltrichlorosilane nor monophenyltrichlorosilane is evident by infrared analysis.

When the product is diluted with diethyl ether, hydrolyzed by standard procedure and stripped of solvent and excess octamethylcyclotetrasiloxane, the stripped copolymer product contains about 8 mol percent monomethylsiloxane units, about 14 mol percent monophenylsiloxane units and about 78 mol percent dimethylsiloxane units as verified by infrared analysis.

EXAMPLE 13

When equal volumes of hexamethyldisiloxane and dimethylhydrogenchlorosilane are mixed with at least 0.1 percent by weight of dibutylamine and 50 percent by weight of ethylene glycol dimethyl ether based on the combined weight of siloxane and silane, after 20 hours at room temperature the system contains trimethylchlorosilane showing the following reaction has taken place:

$$Me_3SiOSiMe_3 + Me_2HSiCl \rightarrow Me_3SiCl + Me_3SiOSiMe_2H + HMe_2SiOSiMe_2H$$

EXAMPLE 14

A mixture of 14.7 grams of tetrachlorosilane, 46 grams of $(Me_3Si)_2O$, 7.8 grams of acetonitrile and 0.5 gram of tetramethylurea was heated for 20 hours at 75° C. and allowed to stand for 16 hours at room temperature. The product was free of tetrachlorosilane and contained 27.6 percent by weight $Me_3SiCl$.

EXAMPLE 15

A mixture of 8.42 grams of tetrachlorosilane, 33.7 grams of $(Me_3Si)_2O$, 3.92 grams of acetonitrile and about 0.1 gram of finely divided sodium chloride was heated for 64 hours at 75° C. and allowed to stand 28 hours at room temperature. The product contained 30.7 percent by weight $Me_3SiCl$ and at most a trace of tetrachlorosilane.

EXAMPLE 16

A mixture of 11.4 grams of tetrachlorosilane, 54.4 grams of $(Me_3Si)_2O$, 7.35 grams of acetonitrile and 0.29 gram of tetra-n-butylammonium iodide was shaken at room temperature for about 72 hours. The resulting product contained no tetrachlorosilane and 27.2 percent by weight $Me_3SiCl$.

EXAMPLE 17

A mixture of 60.4 grams of $(Me_3Si)_2O$, 12.6 grams of tetrachlorosilane, 8.4 grams of acetonitrile and 0.29 gram of tetraethylammonium bromide was shaken at room temperature for about 72 hours. The resulting product contained no tetrachlorosilane and 29.6 percent by weight $Me_3SiCl$.

EXAMPLE 18

Similar results are obtained when 0.5 gram of each of the following catalysts is substituted for the 0.29 gram of tetraethylammonium bromide in Example 17: ethylene diamine, n-hexylamine hydrochloride, di-n-propylamine hydrobromide, diethylamine acetate, methylamine 2-ethylhexoate, aniline, tribenzylamine, di-m-tolylamine, aniline octoate, dibenzylamine 2-ethylhexoate, p-tolylamine stearate, diphenylamine hydrochloride, tetramethylammonium butyrate, benzyl-trimethylammonium chloride, ammonium chloride, ammonium stearate, ammonium propionate, piperazine, acetamide, urea and 1,1,3,3-tetraphenyl-guanidine.

EXAMPLE 19

When the following mixtures of halogenated silicon compounds A and organosiloxanes B are each mixed with 30 parts by weight of acetonitrile and 0.5 part by weight of dimethylformamide and are allowed to stand at room temperature in a closed system for 115 hours, the identifiable product shown is produced showing that a reaction has taken place between A and B, whereby a halogen atom from a molecule of A replaces an oxygen atom attached to a valence bond of a silicon atom in a molecule of B.

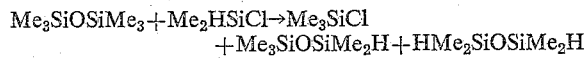

*Table II*

| B | Parts by wt. | A | Parts by wt. | Product |
|---|---|---|---|---|
| $(Et_3Si)_2O$ | 60 | $C_{18}H_{37}SiBr_3$ | 20 | $Et_3SiBr$ |
| $(CF_3CH_2CH_2SiMe_2)_2O$ | 66 | $CF_3CH_2CH_2SiCl_3$ | 16 | $CF_3CH_2CH_2SiMe_2Cl$ |
| $(Cl_2C_6H_3SiMe_2)_2O$ | 86 | $BrC_6H_4SiCl_3$ | 20 | $Cl_2C_6H_3SiMe_2Cl$ |
| $(C_6H_5CH_2SiMe_2)_2O$ | 62 | $ViSiCl_3$ | 10 | $C_6H_5CH_2SiMe_2Cl$ |
| $(C_{18}H_{37}SiMe_2)_2O$ | 64 | $C_6H_{11}SiCl_3$ | 7 | $C_{18}H_{37}SiMe_2Cl$ |
| $(PhMeViSi)_2O$ | 64 | $SiCl_4$ | 8 | $PhMeViSiCl$ |
| $(PhMe_2Si)_2O$ | 64 | $SiCl_4$ | 10 | $PhMe_2SiCl$ |

That which is claimed is:

1. The method which comprises interacting (A) a silicon compound containing per molecule at least one silicon atom having attached thereto at least one halogen atom, and no more than two organic radicals selected from the group consisting of hydrocarbon radicals, halogeno-aromatic monovalent hydrocarbon radicals and fluorinated aliphatic monovalent hydrocarbon radicals, any remaining valences of said silicon atom being satisfied by substituents selected from the group consisting of silicon-bonded oxygen atoms and hydrogen atoms, any other silicon atoms in said compound having their valences satisfied by substituents selected from the group consisting of silicon-bonded oxygen atoms, hydrogen atoms, monovalent hydrocarbon radicals, halogenoaromatic monovalent hydrocarbon radicals and fluorinated aliphatic monovalent hydrocarbon radicals, with (B) an organosiloxane containing per silicon atom an average of from about two or three monovalent substituents selected from the group consisting of hydrogen atoms, hydrocarbon radicals, halogenoaromatic hydrocarbon radicals and fluorinated aliphatic hydrocarbon radicals, any siloxane (B) which has two of said monovalent substituents attached to each silicon atom containing at least four such silicon atoms, any remaining silicon valences being satisfied by silicon-bonded oxygen atoms, in contact with (C) a catalyst selected from the group consisting of aliphatic hydrocarbon amines containing per molecule less than 10 carbon atoms, salts of hydrogen halides and said aliphatic hydrocarbon amines, salts of monocarboxylic acids and aliphatic hydrocarbon amines, said salts containing less than 10 carbon atoms per molecule, aromatic amines, salts of monocarboxylic acids and aromatic amines, salts of hydrogen halides and aromatic amines, ammonium halides, ammonium carboxylates, amides and alkali metal halides and (D) an inert organic solvent other than (C) which has a static dielectric constant greater than about 4, whereby a halogen atom from a molecule of A replaces an oxygen atom attached to a silicon atom in a molecule of B and the remainder of said A molecule attaches to the free oxygen bond in the remainder of the original B molecule.

References Cited in the file of this patent

UNITED STATES PATENTS

| 2,421,653 | Sauer | June 3, 1947 |
| 2,511,296 | Rust | June 13, 1950 |
| 2,877,255 | Clark | Mar. 10, 1959 |